July 31, 1962 J. ECKSTEIN ET AL 3,047,350

AUDIOMETER CASE

Filed July 6, 1960 2 Sheets-Sheet 1

Joel Eckstein
Leo H. Eckstein

By Warren T. Jessup
Attorney

July 31, 1962 J. ECKSTEIN ETAL 3,047,350

AUDIOMETER CASE

Filed July 6, 1960 2 Sheets-Sheet 2

Joel Eckstein
Leo H. Eckstein
By Warren T. Jessup
Attorney 3,047,350

AUDIOMETER CASE

Joel Eckstein and Leo H. Eckstein, both of 1907 Beverly Blvd., Los Angeles, Calif.

Filed July 6, 1960, Ser. No. 41,104
2 Claims. (Cl. 312—300)

The present invention relates to portable units, and it relates more particularly to an electronic instrument which is constructed to be completely portable and yet which may quickly be opened to an appropriate position for convenient bench use.

The invention in one of its aspects is concerned with a relatively small type of electronic measuring instrument, such as an audiometer. An important object of the invention is to provide an improved portable housing for such an instrument. It is important that such a housing completely enclose and protect the instrument itself as it is carried from one place to another; and that the housing be so constructed that the instrument may be readily placed in an appropriate position for convenient use and operation.

An important feature of the present invention, accordingly, is the provision of a portable housing which has a closed condition in which the electronic instrument is entirely enclosed in the housing, and having an open condition in which it forms a base to support the instrument in an essentially upright position. Therefore, when a housing constructed in accordance with the present invention is placed on a work bench and opened, the electronic instrument can be made to assume an appropriate position for convenient operation and use.

In the embodiment of the invention to be described, for example, the electronic instrument itself is completely enclosed in a solid rectangular chassis, and the chassis is mounted on a first wall of the housing by a spring loaded hinge. This hinge provides that when the housing is placed flat on a work bench, for example, the chassis may be spring biased to an upright operative position. To enclose the chassis in the housing, the chassis is pivoted on its hinge down into the housing and against the bias provided by the spring loading of the hinge. A rigid cover is also provided which can be latched into place to enclose the chassis and hold it in the housing.

The cover referred to in the preceding paragraph is hinged to a second wall of the housing which is parallel to the first wall, and it additionally serves as a support for the chassis when the chassis is in its upright position. This latter structural feature provides a rigid and firm support for the chassis when the housing is opened to an operative condition.

The improved assembly of the present invention provides, therefore, an improved compact portable unit in which the chassis may be held enclosed in an external housing, or in which the chassis may be rigidly and firmly supported in an upright operative position, and this is achieved with a minimum of components and members.

Yet another feature of the invention is the provision of a hinged compartment affixed to the cover, which compartment forms a part of the combination and assembly of the invention. A latching means is provided which serves not only to hold the cover member down on the chassis member when the assembly is placed in a closed condition, but which also serves to hold the hinged compartment in a closed condition, as will be described.

Other features and advantages of the invention will become apparent from a consideration of the following specification when considered in conjunction with the accompanying drawings, in which.

Figure 3:
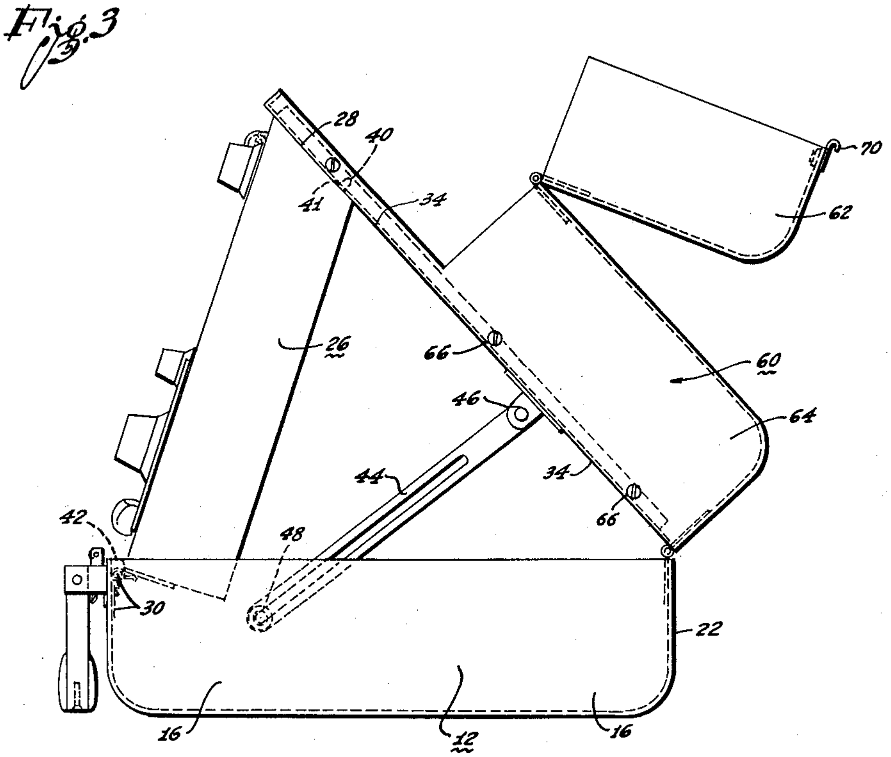
Figure 4:
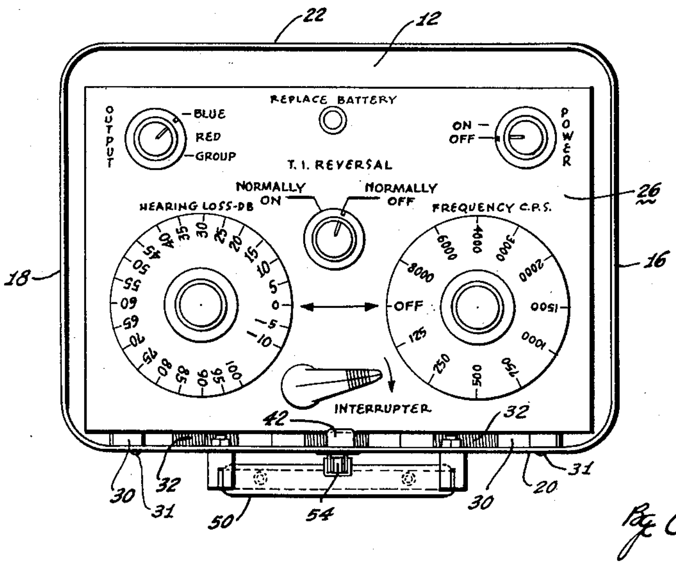

FIGURE 3 is a side elevational view of the assembly of FIGURE 2, this latter view illustrating in more detail the manner in which the several components of the assembly are mounted and coupled to one another; and FIGURE 4 is a plan view of the assembly of FIGURE 3 with the chassis moved down into the associated housing, and with the cover components removed to reveal the manner in which the chassis is supported down in the housing.

The portable electronic unit and assembly illustrated in the drawings is designated generally as 10. This unit includes a casing 12 having a bottom 14. The casing 12 also has a pair of parallel upstanding end walls 16 and 18, and it has a pair of parallel upstanding side walls 20 and 22. In the illustrated embodiment, the side walls and end walls are all integral with the bottom 14.

A chassis for electronic equipment and circuitry is designated as 26, and this chassis has an essentially solid rectangular configuration with an inclined edge 28. In the illustrated embodiment, the chassis 26 supports the components and circuitry necessary to constitute an audiometer for testing the hearing response of subjects. The improved assembly and unit of the present invention is well suited for use in conjunction with such an instrument. However, it will be readily apparent to those versed in the art that the assembly and unit of the invention may be used in conjunction with a wide variety of specific electronic and other units.

A first hinge means 30 is affixed to the chassis 26 and to the side wall 20 at a position displaced down from the top edge of the side wall. The hinge assembly is mounted on the side wall 20 by means of a plurality of screws 31 which permit the chassis to be conveniently removed from the casing for replacement or repair purposes.

Figures 1, 2A, 2B:
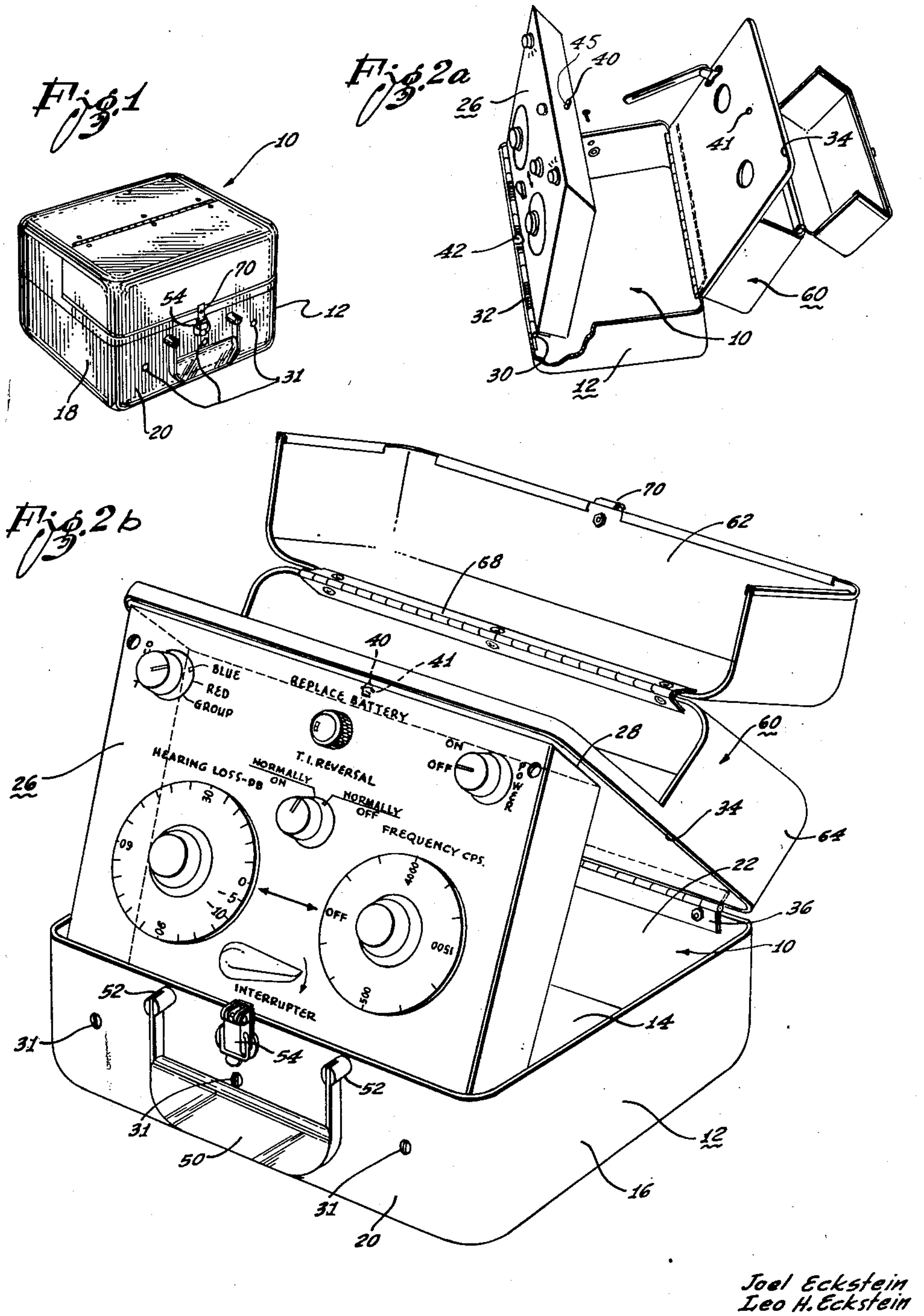
FIGURE 1 is a perspective view of the improved portable assembly of the present invention, this view revealing particularly the manner in which a fastener serves to hold the assembly in a closed condition and also to maintain the two sections of the hinged compartment in a closed condition.
FIGURE 2A is a perspective view of the assembly of FIGURE 1, this view illustrating the assembly in an open condition in which the electronic chassis is spring biased to an inclined position, and the view being partially cut away to reveal a pin in the chassis and a mating aperture in the cover of the assembly to enable the cover to support the chassis.
FIGURE 2B is a perspective view of the assembly of FIGURE 1, on an enlarged scale, the latter view illustrating the assembly in an open operative condition in which the electronic chassis is rigidly supported by the cover in an inclined position, due to the engagement of the pin on the chassis with the aperture in the cover, for convenient operation of the unit.

The hinge means 30 permits the chassis 26 to be pivotable about the pivotal axis of the hinge means 30 from the position of FIGURE 4, in which the chassis 26 is disposed down in the casing 12 essentially parallel to the bottom 14 of the casing and below the plane defined by the upper edges of the upstanding end and side walls of the casing, to the inclined position of FIGURES 2A, 2B and 3 in which the chassis extends out of the casing and up through the plane defined by the upper edges of the side and end walls. A spring means 32 is coupled to the hinge 30 and serves to spring load the hinge so as to bias the chassis to its inclined position of FIGURES 2A, 2B and 3.

A cover 34 for the casing is mounted on the upper edge of the wall 22 by means of a hinge 36. The cover 34 has a pivotal axis which is spaced upwardly from the pivotal axis of the hinge 30. This permits the cover 34 to be folded down over the chassis 26 to hold the chassis down in the casing in its position shown in FIGURE 4. However, when the cover is released, the chassis 26 springs up to its inclined position of FIGURE 2A, so that the cover and chassis may be moved together to form an apex, as shown in FIGURES 2B and 3. In this latter position, the cover 34 engages the inclined edge 28 of the chassis. A pin 40 (FIGURES 2A and 3) is mounted on the inclined edge 28 of the chassis 26, and this pin engages an aperture 41 in the cover 34 when the cover and chassis are in their inclined positions of FIGURES 2 and 3. The upper or forward surface of pin 40 is notched at 45 to engage the edge of aperture 41, for minimizing danger of accidental disengagement of pin and aperture. This engagement of the pin 40 with the aperture in the cover 34 provides a firm and rigid support for the chassis 26, when the chassis is supported in its inclined open position. A resilient stop member 42 is mounted on the inner side of the wall 20, and this stop member may be formed of a suitable rubber-like material. The stop member engages the chassis 26, as it is pivoted upwardly by the spring 32 from its position of FIGURE 4 to its position of FIGURES 2 and 3, so as to limit the pivotal movement of the chassis and function as a shock absorber.

A sliding bracket 44 is pivoted to the cover 34 by a usual pivot mount 46. A further pivot 48 is provided in the end wall 16 which slidably engages the bracket 44. The bracket 44 and its associated components serves to render more rigid the structure of the illustrated embodiment of the invention.

An appropriate handle 50 is mounted on the side wall 20 by appropriate pivot mounts 52. A clasp fastener 54 is also mounted on the side wall 20 on the opposite side of the wall from the resilient stop member 42.

A housing 60 is supported on the cover 34 to form a compartment, with the cover itself forming the bottom of the compartment. The housing 60 is composed of two hinged sections 62 and 64. The section 64 is mounted on the cover 34 by screws 66. The section 62 is mounted on the section 64 by means of a hinge 68. A bracket 70 is mounted on one edge of the section 62, and that bracket is adapted to be engaged by the clasp fastener 54, as shown in FIGURE 1, when the assembly is in a closed condition. Therefore, the clasp 54 serves not only to hold the cover 34 down over the chassis 26, but it also serves to hold the hinged section 62 of the housing 60 in a closed condition with respect to the section 64. The compartment formed by the hinged sections 62 and 64 of the housing 60 is convenient for storing wires, head phones, and other extraneous equipment for use with the instrument formed by the chassis 26.

The invention provides, therefore, a convenient unitary assembly for an electronic instrument, and the like. The assembly of the invenition is rugged in its assembly and it may be fabricated in a simple and straightforward manner and requires relatively few component parts. The unit of the invention is advantageous in that it may be closed to a condition in which the electronic unit is completely enclosed by a casing, and in that it can be immediately opened to form a support for the electronic instrument by which the instrument is rigidly supported in an essentially upright position and convenient bench use. The assembly of the invention is also advantageous in its provision of a convenient compartment formed on its cover for the transportation of extraneous wires and equipment normally required in conjunction with the instrument housed in the casing.

What is claimed is:

1. A portable electronic unit including: a casing having a bottom and a pair of parallel upstanding end walls and a pair of parallel upstanding side walls all integral with one another and with said bottom, a chassis for electronic equipment and circuitry having an essentially solid rectangular configuration, a first hinge means affixed to one of said side walls and to said chassis to cause said chassis to be pivotable about the pivotal axis of said first hinge means from a position within the casing essentially parallel to the bottom thereof and below the plane defined by the upper edges of said upstanding walls to an inclined position in which said chassis extends out of said casing up through said plane, spring means included in said casing for pivotally biasing said chassis to an upright position, a cover member for said casing, a second hinge means affixed to said cover member and to the other of said side walls to have a pivotal axis spaced from said first hinge means so that said cover member and said chassis may form an apex when said chassis is in said inclined position, a fastener means affixed to one of said side walls, a housing supported on said cover member with said cover member forming a bottom for said housing, said housing being formed of two hinged sections to permit access thereto, and means mounted on one of said hinged sections of said housing to be engaged by said fastener means to enable said housing to be held in a closed condition and further to enable said cover to be held closed over the top edges of said side walls to retain said chassis in said first position against the biasing force of said spring means.

2. A portable electronic unit including: a casing having a bottom and a pair of parallel upstanding end walls and a pair of parallel upstanding side walls all integral with one another and with said bottom, a chassis for electronic equipment and circuitry having an essentially solid rectangular configuration with an inclined edge, first hinge means affixed to said chassis and to a first of said side walls at a position displaced down from the top edge of said first side wall to cause said chassis to be pivotable about the pivotal axis of said first hinge means from a first position within the casing essentially parallel to the bottom thereof and below the plane defined by the upper edges of said upstanding walls to an inclined position in which said chassis extends out of said casing and up through said plane, spring means coupled to said chassis and to said casing for biasing said chassis to said inclined position, a cover member for said casing, a resilient stop member mounted on said first of said side walls to engage said chassis and limit the pivotal movement thereof as said chassis is biased by said spring means to said inclined position, a second hinge means affixed to said cover member and to the other of said side walls to have a pivotal axis spaced from said first hinge means so that said cover member and said chassis may form an apex when said chassis member is in said inclined position with said cover member engaging the inclined upper edge of said chassis member, a fastener means affixed to said first of said side walls, a pin mounted on one of said members and adapted to engage an aperture formed in the other of said members to enable said cover member and said chassis member to engage and rigidly hold one another when said chassis member is in said inclined position, a housing supported on said cover member with said cover member forming a bottom for said housing, said housing being formed of two hinged sections to permit access thereto, and which includes means mounted on one of said hinged sections of said housing to be engaged by said fastener means to enable said housing to be held in a closed condition and further to enable said cover to be held closed over the top edges of said side walls to retain said chassis in said first position against the biasing force of said spring means.

References Cited in the file of this patent

UNITED STATES PATENTS

| | | |
|---|---|---|
| 1,020,770 | Matalene | Mar. 19, 1912 |
| 1,553,857 | Golden | Sept. 15, 1925 |
| 1,578,607 | Levy | Mar. 30, 1926 |
| 2,650,150 | Smith | Aug. 25, 1953 |